United States Patent
McGowan et al.

(10) Patent No.: US 7,814,152 B2
(45) Date of Patent: *Oct. 12, 2010

(54) CONTEXT-SPECIFIC INSTANT MESSAGING

(75) Inventors: Patrick Gabriel McGowan, Stoney Creek, NC (US); Christopher Joseph Paul, Durham, NC (US); Jeremy Gray Perry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/169,066

(22) Filed: Jul. 8, 2008

(65) Prior Publication Data

US 2008/0270518 A1    Oct. 30, 2008

Related U.S. Application Data

(63) Continuation of application No. 11/093,664, filed on Mar. 30, 2005, now Pat. No. 7,467,181.

(51) Int. Cl.
*G06F 15/16* (2006.01)
(52) U.S. Cl. ............... 709/204; 340/573.1; 715/752; 709/202; 709/206
(58) Field of Classification Search ............ 709/206, 709/202, 204; 340/573.1; 715/752
See application file for complete search history.

(56) References Cited

U.S. PATENT DOCUMENTS

| | | | |
|---|---|---|---|
| 7,117,445 B2 * | 10/2006 | Berger | 715/752 |
| 2003/0037112 A1 | 2/2003 | Fitzpatrick et al. | 709/205 |
| 2003/0058277 A1 | 3/2003 | Bowman-Amuah | 345/765 |
| 2004/0064514 A1 | 4/2004 | Daniell et al. | 709/206 |
| 2004/0078448 A1 | 4/2004 | Malik et al. | 709/206 |
| 2004/0078596 A1 | 4/2004 | Kent, Jr. et al. | 713/201 |
| 2004/0111479 A1 | 6/2004 | Borden et al. | 709/206 |
| 2004/0212505 A1 * | 10/2004 | Dewing et al. | 340/573.1 |
| 2007/0061753 A1 | 3/2007 | Ng et al. | 715/816 |
| 2008/0077558 A1 | 3/2008 | Lawrence et al. | 707/3 |

FOREIGN PATENT DOCUMENTS

EP    1361765 A1    11/2003

* cited by examiner

*Primary Examiner*—Tammy T Nguyen
(74) *Attorney, Agent, or Firm*—VanLeeuwen & VanLeeuwen

(57) ABSTRACT

Context-specific instant messaging is presented. A user views a page of data that is segmented into regions. The user performs a user action (e.g., a mouse click) and, in turn, a message generator displays context-specific phrases for the user to select based upon the region that the user action was performed and a corresponding object type. When a region corresponds to a meeting time, a context-specific phrase may also be time-sensitive. When a region corresponds to meeting participants, a context-specific phrase may include recipient identifiers. The user selects one of the context-specific phrases, and the message generator invokes a message session between the user and a recipient based upon the selected context-specific phrase. The message generator includes a link to the corresponding object such that the message recipient may easily identify the context of the message.

21 Claims, 7 Drawing Sheets

CONTEXT-SPECIFIC INSTANT MESSAGING

This application is a continuation application of co-pending U.S. Non-Provisional patent application Ser. No. 11/093,664, entitled "System and Method for Context-Specific Instant Messaging," filed on Mar. 30, 2005.

BACKGROUND OF THE INVENTION

1. Technical Field

The present invention relates in general to a system and method for context-specific instant messaging. More particularly, the present invention relates to a system and method for invoking a message session based upon the location of a user action that corresponds to a particular object type.

2. Description of the Related Art

Communication and collaboration have quickly become key elements of enterprise software. One feature that exists in enterprise software packages is the ability for a user to conduct a "chat" session with other online users (e.g., instant messaging).

Enterprise software typically invokes a chat session in a generic context. Meaning, a user selects a recipient, and the enterprise software invokes a chat session between the user and the recipient without regard for the user's purpose for communicating with the recipient. However, users do not typically enter into chat sessions with other users for leisurely conversation. Instead, a user is prompted or triggered by the presence of an individual's name in a specific context. For example, a user may be reviewing a document that was written by an individual and, in this example, the user may wish to receive more information from the individual regarding the particular document. A challenge found is that when a user initiates a generic chat session, the user must include the purpose and the context of the chat session.

Another challenge found is that when a recipient receives a message, the recipient typically spends time trying to identify the context of the message. For example, if a recipient receives a message that states "What time is our meeting?" and the recipient has many meetings scheduled, the recipient may spend time researching multiple calendar entries before identifying the meeting that corresponds to the message.

What is needed, therefore, is a system and method for users to efficiently communicate based upon the context of a user's environment.

SUMMARY

It has been discovered that the aforementioned challenges are resolved using a system and method that invokes a message session based upon the location of a user action that corresponds to a particular object type. A user views a page of data that is segmented into regions. The user performs a user action (e.g., a mouse click) and, in turn, a message generator displays context-specific phrases for the user to select based upon the region that the user action was performed. The user selects one of the context-specific phrases, and the message generator invokes a message session between the user and a recipient based upon the selected context-specific phrase.

A user instructs his client to display a user interface window that corresponds to a particular object type. For example, the user may be viewing his calendar and select a calendar entry that is a meeting. The client identifies the selected object type, and displays a corresponding user interface window that is segmented into regions. Using the example described above, the page of data may include meeting information that is segmented into regions that correspond to the meeting location, the meeting time, the meeting chair, and the meeting participants.

The user positions his pointer over a particular region and performs a user action, such as a right mouse click. A message generator identifies the region where the user action was performed, and retrieves context-specific phrases from a storage area that correspond to the identified region. For example, if the identified region corresponds to a meeting location and the region does not include the meeting location, a context-specific phrase may be "Where is the meeting?" When a region corresponds to a meeting time, a context-specific phrase may also be time-sensitive, such as "I'm running a few minutes late to the meeting." When a region corresponds to meeting participants, a context-specific phrase may include recipient identifiers and, in turn, the user may select a particular which meeting participant to send a message.

Once the message generator collects the context-specific phrases, the message generator displays the phrases in a phrase window. The user views the context-specific phrases, and selects one of the phrases in the phrase window. In turn, the message generator invokes a context-specific message session and includes the selected phrase in the context-specific message session. For example, if the user selects the phrase "Where is the meeting?", the message generator includes the "Where is the meeting?" phrase in the context-specific message session and addresses the message session to the meeting host. In another example, if the user selects a particular meeting participant to send a message, the context-specific message session addresses the session to the selected meeting participant.

The message generator also includes a link to the object that corresponds to the user interface window, such that the message recipient may easily view the object (e.g., meeting entry, online document, etc.). The message generator also allows the user to add additional text into the context-specific message session and, when the user is finished, the message generator sends a context-specific message to the recipient based upon the context-specific message session. The user and the recipient may pass messages to each other until the user or the recipient close the context-specific message session.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
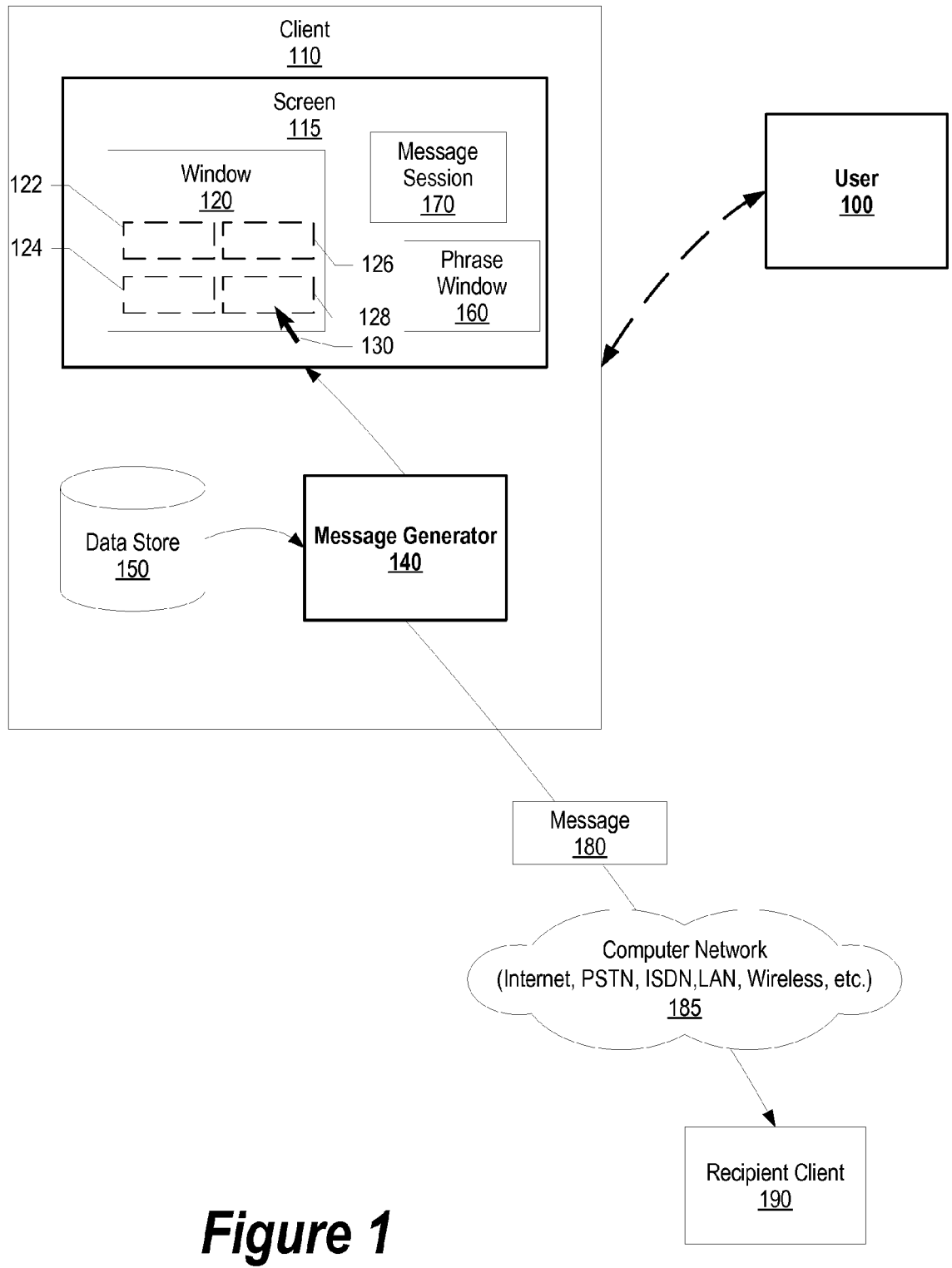
FIG. 1 is a diagram showing a user invoking a context-specific message session based upon the user performing a user action within a particular window region.

FIG. 1 is diagram showing a user invoking a context-specific message session based upon the user performing a user action within a particular window region. The user requests client 110 to display a user interface window that corresponds to a particular object type. For example, the user may be viewing his calendar and select a calendar entry that is a meeting. Client 110 identifies the selected object type and displays window 120, which corresponds to the selected object type. Window 120 includes a page of data that is segmented into regions 122-128. Using the example described above, the page of data may include meeting information that is segmented into regions that correspond to the meeting location, the meeting time, the meeting chair, and the meeting participants.

The user positions pointer 130 over region 128 and performs a user action, such as a right mouse click. As one skilled in the art can appreciated, a use may navigate around a user interface window using other means, such as using tab buttons. Message generator 140 detects that the user action was performed, and retrieves context-specific phrases from data store 160 that correspond to region 128. For example, if a region corresponds to a meeting location and the region does not include a particular meeting location, message generator 140 may retrieve a context-specific phrase such as "Where is the meeting?" Another example is when a region corresponds to a meeting time and context-specific phrases may be time-sensitive. In this example, the user action may be performed is past the meeting time and message generator 140 may retrieve a context-sensitive message such as "I'm running a few minutes late to the meeting." Yet another example is when a region corresponds to meeting participants, in which case the context-specific phrase may include recipient identifiers and, in turn, the user may choose which meeting participant to send a message.

In one embodiment, an administrator may manage the context-specific phrases that correspond to particular objects. In this embodiment, the administrator may disable phrases, modify existing phrases, or create new phrases that are associated with various object types.

Once message generator 140 collects the context-specific phrases, message generator 140 displays the phrases in phrase window 160. The user views the context-specific phrases, and selects one of the phrases in phrase window 160. In turn, message generator 140 invokes message session 170 and includes the selected phrase in message session 170. For example, if the user selects the phrase "Where is the meeting?", message generator 140 includes the "Where is the meeting?" phrase in message session 170 and addresses message session to the meeting chair. In another example, if the user selects a particular meeting participant to send a message, message session 170 addresses the session to the selected meeting participant.

Message generator 140 includes a link to window 120's corresponding object in message session 170 such that a message recipient may easily view the object (e.g., meeting entry, online document, etc.). Message generator 140 also allows the user to add additional text into message session 170 and, when the user is finished, message generator 140 generates message 180 based upon message session 170 (see FIGS. 3B, 6, and corresponding text for further details regarding object link and additional user text inclusion).

Message generator 140 sends message 180 to recipient client 190 over computer network 185, such as the Internet. Recipient client 190 corresponds to the recipient address of message session 170. Using the example described above, if message session 170 was addressed to the meeting chair, recipient client 190 is the meeting chair's client computer system. Client 110 and recipient client 190 may pass messages to each other until the user or recipient client 190's user close message session 170.

Figure 2A:
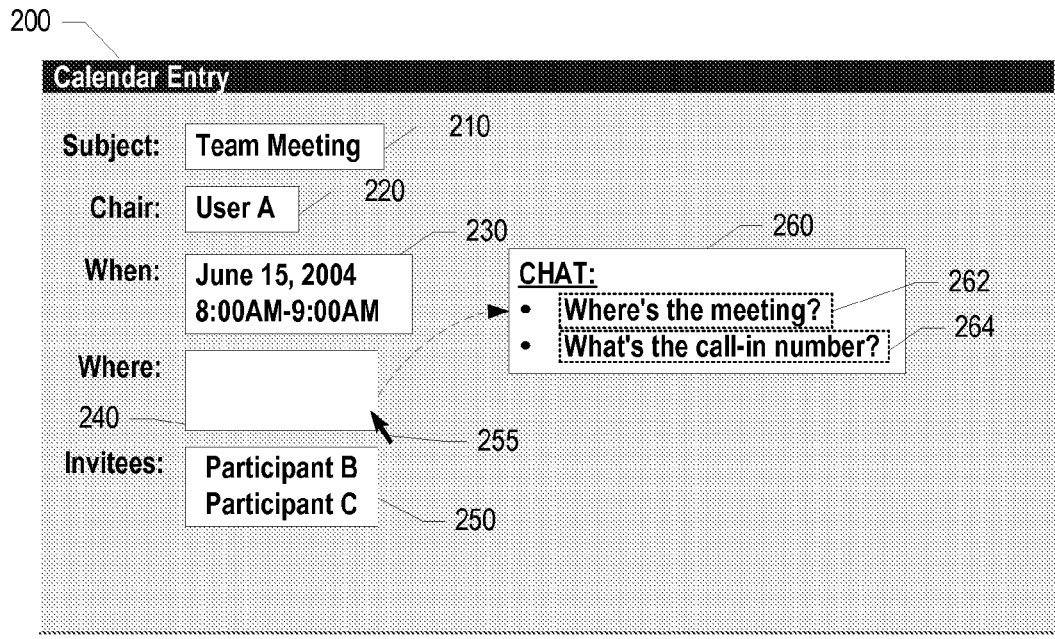
FIG. 2A is a calendar user interface window showing a user performing a user action in a region that corresponds to a meeting location.

FIG. 2A is a calendar user interface window showing a user performing a user action in a region that corresponds to a meeting location. Window 200 corresponds to a calendar entry meeting object, and is a page of data that includes regions 210-250. Region 210 corresponds to the meeting subject. Region 220 corresponds to the meeting chair. Region 230 corresponds to the meeting time. And, region 240 corresponds to the meeting participants.

A user may invoke a context-specific message session by positioning pointer 255 over a particular region and performing a user event, such as a right mouse click. The example shown in FIG. 2A shows that a user positioned pointer 255 over region 240 and performed a user action in order to find out more information regarding the meeting location. When a message generator detects the user action, the message generator identifies the region where the user action took place, and retrieves context-specific phrases corresponding to the identified region.

In turn, the message generator displays the context-specific phrases in phrase window 260. The example shown in FIG. 2A shows that phrase window 260 includes phrases 262 and 264, which both correspond to region 240. A user selects one of the phrases and, as a result, the message generator includes the selected phrase in a message session window (see FIG. 3B and corresponding text for further details regarding message session window properties).

Figure 2B:
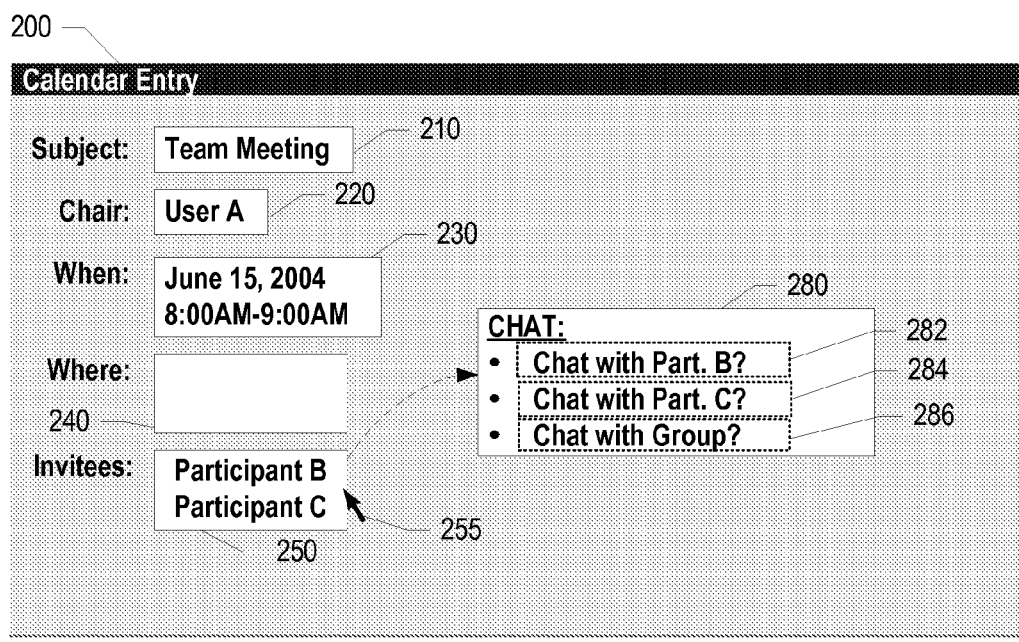
FIG. 2B is a calendar user interface window showing a user selecting a region that corresponds to meeting participants in order to initiate a context-specific message session with one or more of the meeting participants.

FIG. 2B is a calendar user interface window showing a user selecting a region that corresponds to meeting participants in order to initiate a context-specific message session with one or more of the meeting participants. FIG. 2B is similar to FIG. 2A with the exception that the user positioned pointer 255 over region 250 and performed a user action.

As can be seen, the message generator retrieved and displayed context-specific phrases that correspond to region 250 in phrase window 280. Since region 250 corresponds to meeting participants, the user may send a message to participant B, participant C, or the group by selecting phrase 282, 284 or 286, respectively.

Figure 3A:
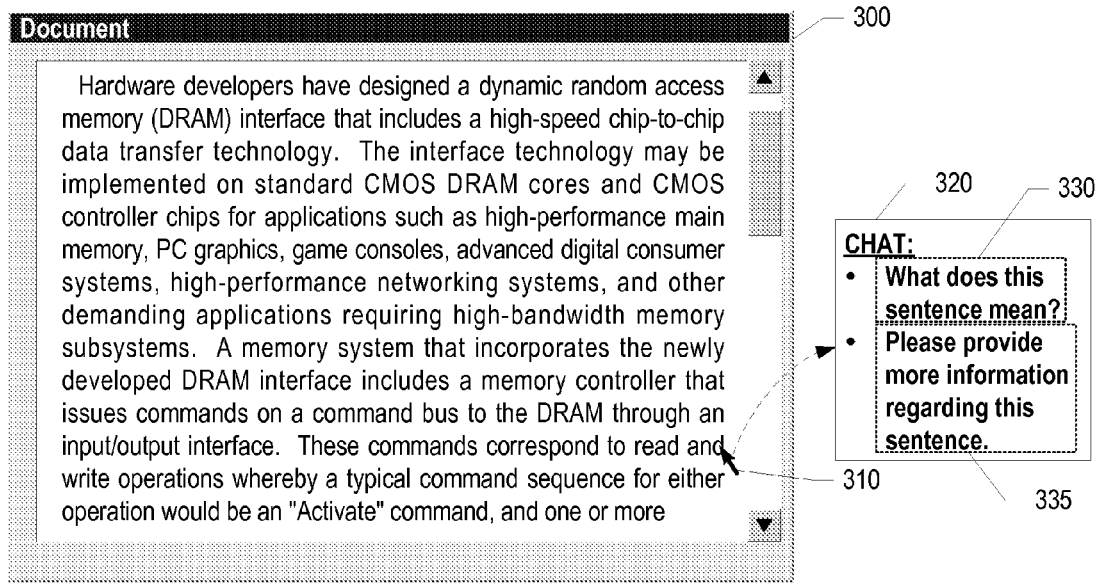
FIG. 3A is a user interface window that allows a user to view a document and send a context-specific message to the document owner based upon a particular area of the document.

FIG. 3A is user interface window that allows a user to view a document and send a context-specific message to the document owner based upon a particular area of the document. A user views a document in window 300, and as the user reads the document, the user may reach a sentence that he does not understand or would like more information regarding the sentence's subject. As such, the user wishes to invoke a context-specific message session with the document owner.

The user invokes the context-specific message by positioning pointer 310 over the sentence in question, and performs a user action (e.g., right mouse click). In turn, a message generator retrieves context-specific phrases corresponding to the document, and displays the phrases in phrase window 320. As can be seen in FIG. 3A, a user may select phrase 330 to ask the document owner "What does this sentence mean?" or the user may select phrase 335 to ask the document owner "Can you please provide more information regarding this sentence?"

When the user selects either phrase 330 or 335, the message generator opens a message session window that is addressed to the document owner and includes a link to the document and sentence. The user is able to add other text into the message session, and the message generator sends the context-specific message to the document owner (see FIG. 3B and corresponding text for further details regarding message sessions).

Figure 3B:
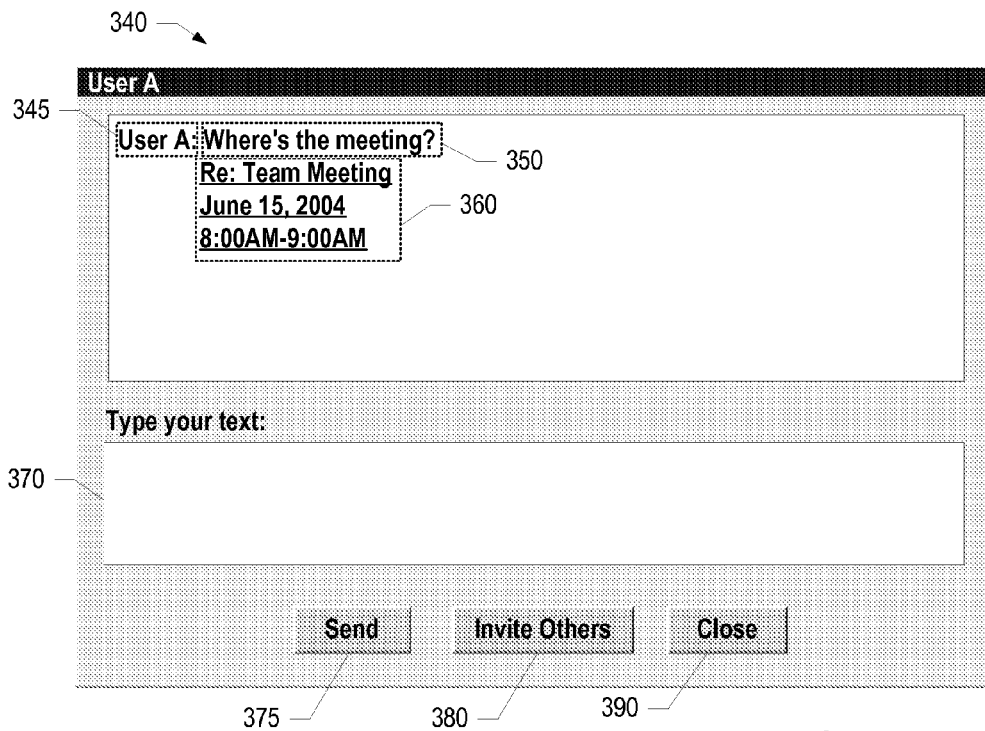
FIG. 3B is a message session window that includes a context-specific phrase and an object link.

FIG. 3B is message session window that includes a context-specific phrase and an object link. When a user invokes a context specific message session by performing a user action on a particular region, a message generator displays a phrase window for the user to select a context-specific phrase, such as those shown in FIGS. 2A, 2B, and 3A. When the user selects one of the context-specific phrases in the phrase window, the message generator invokes a message session and displays a message session window, such as window 340.

The message generator addresses the message session to a particular recipient and includes a recipient identifier in box 345, which may be the object owner or it may be a meeting participant. The example in FIG. 3B shows that the message session is addressed to "User A," which corresponds to the meeting chair of the meeting entry shown in FIGS. 2A and 2B.

The message generator includes the context-specific phrase in window 340 that was selected by the user, which is shown in box 350. The example shown in FIG. 3B shows that the user is sending a message to the meeting chair asking him "Where's the meeting?" The message generator also includes a link to the corresponding object, as can be see in box 360, which allows a message recipient to open the object that corresponds to the message session.

The message generator also allows a user to type in additional text in area 370 if the user wishes to add additional comments or questions besides the context-specific phrase. When the user wishes to send the message to the recipient, the user selects command button 375. If the use wishes to send the message to other recipients and include them in the message session, the user selects command button 380 and the message generator opens a directory window for the user to select other recipients. When the user wishes to close the message session, the user selects command button 390, which closes window 340 and the message session ends.

Figure 4:
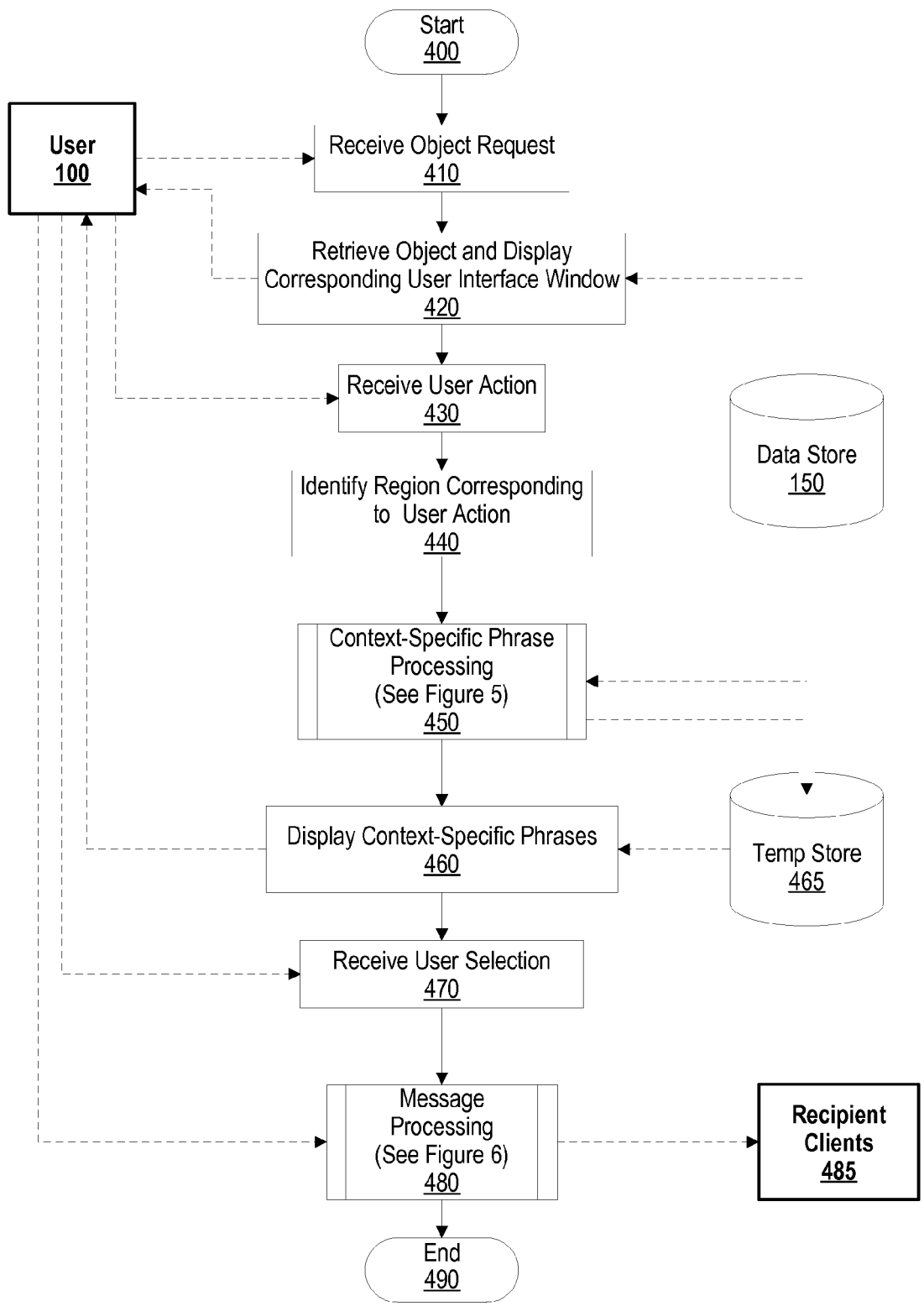
FIG. 4 is a high-level flowchart showing steps taken in sending a message that includes one or more context-specific phrases to one or more recipients.

FIG. 4 is a high-level flowchart showing steps taken in sending a message that includes one or more context-specific phrases to one or more recipients. Processing commences at 400, whereupon processing receives an object request from the user (step 410). For example, the user may be viewing his calendar and select a calendar entry object that is a meeting. The user is the same as that shown in FIG. 1.

At step 420, processing retrieves the object from data store 150 and displays a corresponding user interface window for the user to view (e.g., details of a meeting). The user interface window includes a page of data that is segmented into regions, which are context-specific. Using the example describe above, the user interface window may include regions that correspond to the location of a meeting, the time of the meeting, and meeting participants. Data store 150 is the same as that shown in FIG. 1.

The user views the user interface window, and performs a user action within one of the regions on the page of data, which processing receives at step 430. At step 440, processing identifies the region that the user action was performed. Processing then retrieves context-specific phrases corresponding to the identified region from data store 150, and stores the context-specific phrases in temporary store 465 (pre-defined process block 450, see FIG. 5 and corresponding text for further details). Temporary store 465 may be stored on a nonvolatile storage area, such as a computer hard drive.

Context-specific phrases are particular to the object type as well as the identified region. For example, if the identified region corresponds to a meeting location, a context-specific phrase may be "Where is the meeting?" Another example is when the identified region corresponds to a meeting time, in which case a context-specific phrase may also be time-sensitive, such as "I'm running a few minutes late to the meeting." Yet another example is when the identified region corresponds to meeting participants, in which case the context-specific phrase may include recipient identifiers and, in turn, a user may choose which meeting participant to send a message.

Processing displays the context-specific phrases for the user to view at step 460. The user views the context-specific phrases, and selects one of the phrases, which processing receives the selection at step 470. At step 480, processing invokes a message session and sends a context-specific message to recipient clients 485 (pre-defined process block 480, see FIG. 6 and corresponding text for further details). Processing ends at 490.

Figure 5:
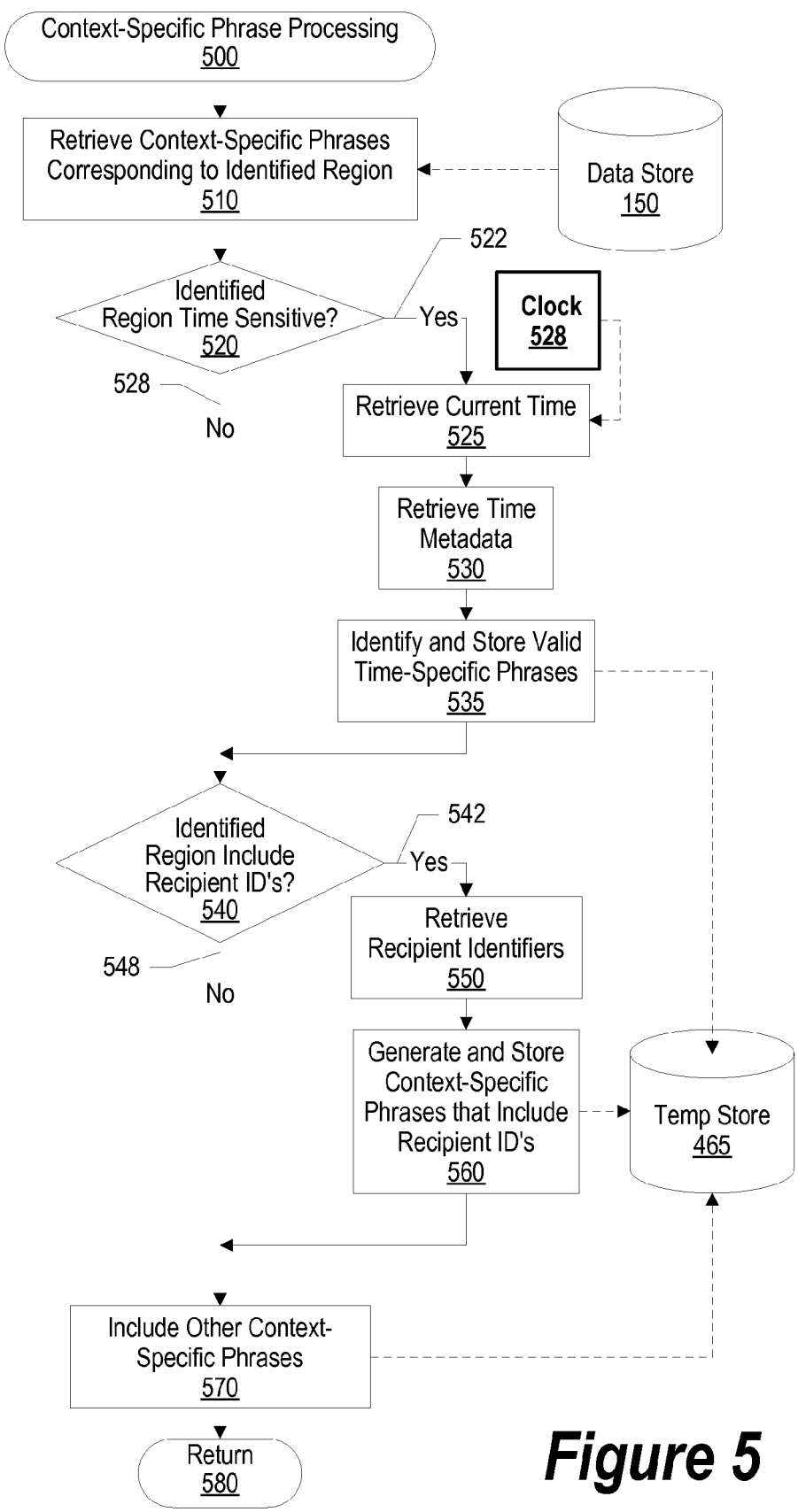
FIG. 5 is a flowchart showing steps taken in collecting context-specific phrases that correspond to a region where a user action was performed.

FIG. 5 is a flowchart showing steps taken in collecting context-specific phrases that correspond to a region where a user action was performed. A user performed a user action (e.g., mouse click) within a region of a page of data that is included in a user interface window. Processing identified the region (see FIG. 4), and, in FIG. 5, proceeds through a series of steps in order to collect context-specific phrases that correspond to the identified region.

Processing commences at 500, whereupon processing retrieves context-specific phrases from data store 150 that correspond to the identified region (step 510). Data store 150 is the same as that shown in FIG. 1. Based upon the properties of the identified region, context-specific phrases may include phrases such as "Where is the meeting", "Chat with Participant X", or "What does this sentence mean?"

Context-specific phrases may also be time-sensitive. For example, if the identified region corresponds to a meeting time and the user event occurred after the meeting commenced, a context-specific phrase may be "I'm running a few minutes late to the meeting." Using the same example, if the user event occurred before the meeting commenced, a context-sensitive phrase may be "I may be a few minutes late to the meeting." A determination is made as to whether the identified region corresponds to time-sensitive phrases (decision 520). If the identified region corresponds to time-sensitive phrases, decision 520 branches to "Yes" branch 522 whereupon processing retrieves a current time from clock 528 at step 525. Clock 528 is a device that tracks the time of day, such as a system clock.

At step 530, processing retrieves time-sensitive metadata from the object that corresponds to the identified region. For example, for a meeting object, processing may retrieve the time that the meeting is scheduled to start.

Processing identifies valid time-sensitive phrases by comparing the current time with the retrieved time metadata, and stores the valid time-sensitive phrases in temp store 465 (step 535). Using the example described above, if the meeting started before the user event, the phrase "I'm running a few minutes late to the meeting" may be stored in temporary store 465. Temporary store 465 may be stored on a nonvolatile storage area, such as a computer hard drive. On the other hand, if the identified region does not correspond to time-sensitive phrases, decision 520 branches to "No" branch 528 bypassing time-sensitive phrase-storing steps.

A determination is made as to whether the identified region corresponds to recipient identifiers. For example, a user may perform a user action in a region that corresponds to meeting participants in order to send a message to one of the participants. If the identified region includes recipient identifiers, decision 540 branches to "Yes" branch 542 whereupon processing retrieves the recipient identifiers from the object that corresponds to the identified region at step 550. Processing generates context-specific phrases that include the recipient identifiers and stores the phrases in temporary store 465 at step 560. For example, if a recipient identifier is "Participant A," processing generates a context-specific phrase such as "Chat with Participant A?"

Processing includes other context-specific phrases that correspond to the identified region in temporary store 465 at step 570. These phrases may include phrases such as "Where is the meeting?", "When is the meeting?", and "What does this sentence mean?" Processing returns at 580.

Figure 6:
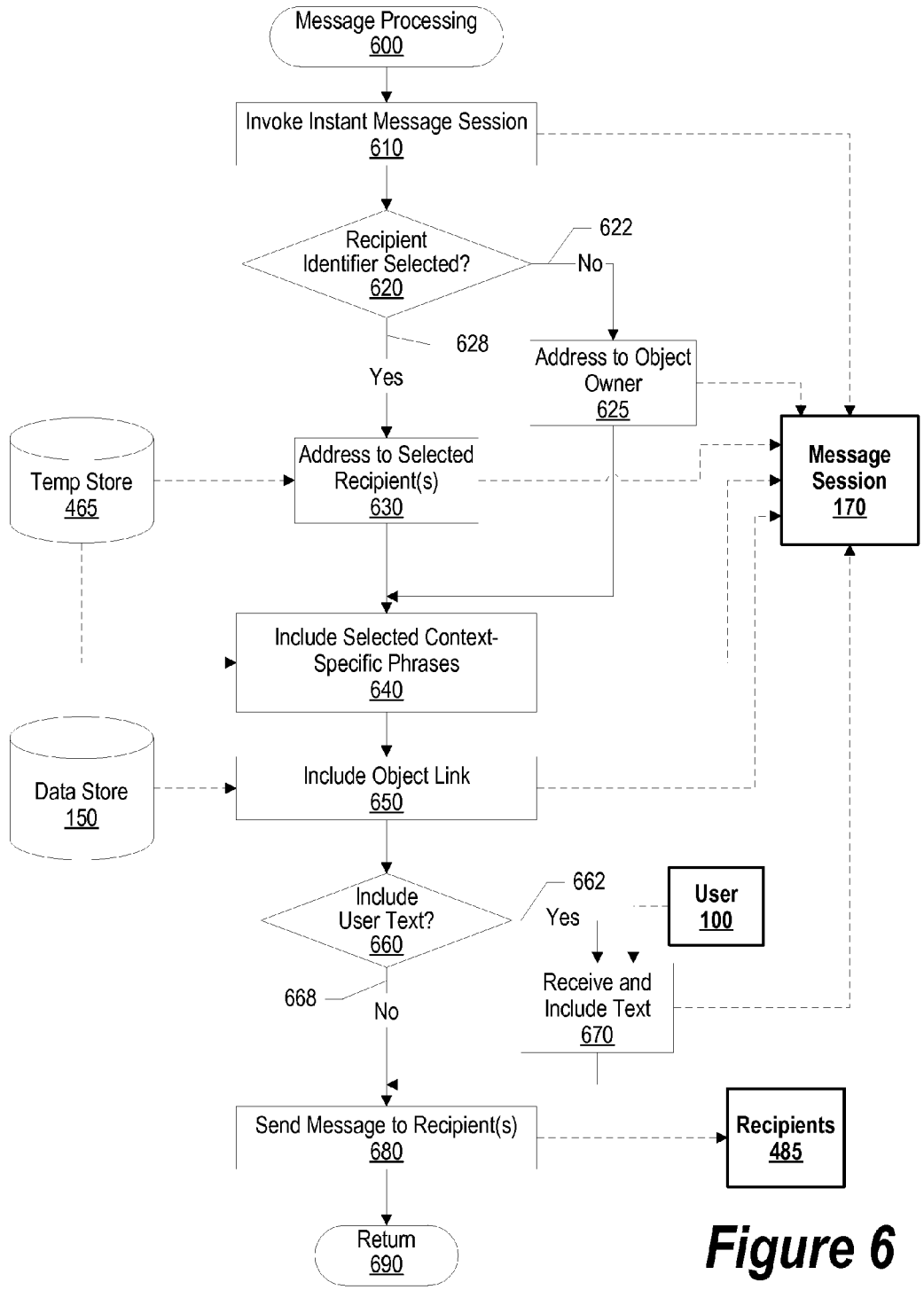
FIG. 6 is a flowchart showing steps taken in generating a context-specific message.

FIG. 6 is a flowchart showing steps taken in generating a context-specific message. The context-specific message includes a context-specific phrase, an object link, and may include other user text. Processing commences at 600, whereupon processing invokes message session 170 at step 610. Message session 170 is the same as that shown in FIG. 1.

A determination is made as to whether the user selected a context-specific phrase that included a recipient identifier, such as "Chat with Participant A" (decision 620). If the user did select a context-specific phrase that includes a recipient identifier, decision 620 branches to "Yes" branch 628 whereupon processing retrieves recipient information from temporary store 165 and addresses message session 170 to the corresponding recipients (step 630). On the other hand, if the selected context-specific phrase did not include a recipient identifier, decision 620 branches to "No" branch 622 whereupon processing addresses message session 170 to the owner of the corresponding object at step 625. Temporary store 465 is the same as that shown in FIG. 4.

Processing retrieves context-specific phrases that were selected by the user from temp store 465, and includes the phrases in message session 170 (step 640). At step 650, processing includes an object link corresponding to the object in message session 170 that allows a message recipient to easily view the object that corresponds to the message. For example, if the message corresponds to a meeting, the object link is a link to the meeting entry. In another example, if the message is in regards to a sentence in a document, the object link is a link to the sentence in question within the document.

A determination is made as to whether the user wishes to include additional text in message session 170, such as "Can I invite Participant D to the meeting?" (decision 660). If the user wishes to include additional user text, decision 660 branches to "Yes" branch 662 whereupon processing receives text from the user and includes the text in message session 170 (step 670). On the other hand, if the user does not wish to add additional text, decision 660 branches to "No" branch 668, bypassing text inclusion steps. The user is the same as that shown in FIG. 1.

At step 680, processing sends a context-specific message to recipients 485 based upon message session 170. The user and recipients 485 may continue to send messages to each other until message session 170 closes. Recipients 485 are the same as that shown in FIG. 4. Processing returns at 690.

Figure 7:
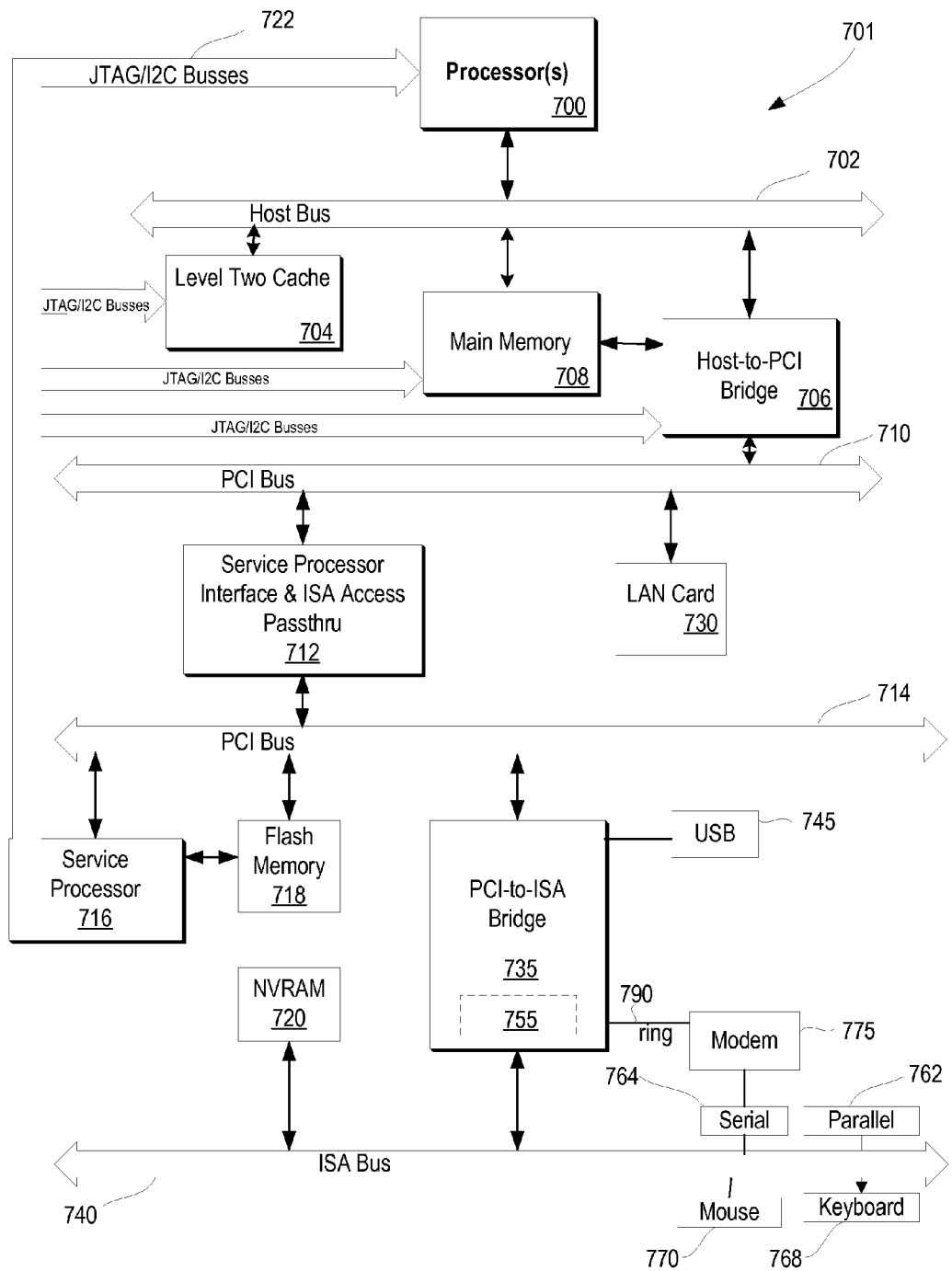
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "aa" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a user action corresponding to a page of data, the page of data displayed on a video display device and including a plurality of regions;
   identifying the region from the plurality of regions where the user action was performed;
   retrieving, from computer readable storage, one or more context-specific phrases that correspond to the identified region;
   receiving a phrase selection from a user that corresponds to one of the context-specific phrases;
   including the context-specific phrase corresponding to the phrase selection in a context-specific message; and
   sending the context-specific message to a recipient over a computer network.

2. The method of claim 1 further comprising:
   displaying, on the video display device, the one or more context-specific phrases.

3. The method of claim 1 further comprising:
   including a page link in the context-specific message, the page link corresponding to the page of data.

4. The method of claim 1 further comprising:
   determining that the identified region is time sensitive;
   retrieving a current time; and
   selecting the one or more context-specific phrases based upon the retrieved current time.

5. The method of claim 1 further comprising:
   receiving user text; and
   including the user text in the context-specific message session.

6. The method of claim 1 wherein the identified region corresponds to one or more recipient identifiers, the method further comprising:
   displaying, on the video display device, the one or more recipient identifiers; and
   wherein the phrase selection corresponds to one of the recipient identifiers.

7. The method of claim 1 wherein each of the plurality of regions corresponds to a different location within a user interface window.

8. A program product comprising Non-transitory:
   computer storage medium having computer readable code, the computer readable code being effective to:
   receive a user action corresponding to a page of data, the page of data displayed on a video display device and including a plurality of regions;
   identify the region from the plurality of regions where the user action was performed;
   retrieve, from computer readable storage, one or more context-specific phrases that correspond to the identified region;
   receive a phrase selection from a user that corresponds to one of the context-specific phrases;
   include the context-specific phrase corresponding to the phrase selection in a context-specific message; and
   send the context-specific message to a recipient over a computer network.

9. The program product of claim 8 wherein the computer readable code is further effective to:
   display, on the video display device, the one or more context-specific phrases.

10. The program product of claim 8 wherein the computer readable code is further effective to:
    include a page link in the context-specific message, the page link corresponding to the page of data.

11. The program product of claim 8 wherein the computer readable code is further effective to:
    determine that the identified region is time sensitive;
    retrieve a current time; and
    select the one or more context-specific phrases based upon the retrieved current time.

12. The program product of claim 8 wherein the computer readable code is further effective to:
    receive user text; and
    include the user text in the context-specific message session.

13. The program product of claim 8 wherein the identified region corresponds to one or more recipient identifiers, the computer readable code further effective to:
    display, on the video display device, the one or more recipient identifiers; and
    wherein the phrase selection corresponds to one of the recipient identifiers.

14. The program product of claim 8 wherein each of the plurality of regions corresponds to a different location within a user interface window.

15. An information handling system comprising:
    one or more processors;
    a video display device;
    a memory accessible by the processors;

one or more nonvolatile storage devices accessible by the processors; and a message generation tool for generating context-sensitive message sessions, the message generation tool being effective to:

receive a user action corresponding to a page of data, the page of data displayed on the video display device and including a plurality of regions;

identify the region from the plurality of regions where the user action was performed;

retrieve one or more context-specific phrases that correspond to the identified region from one of the nonvolatile storage devices;

receive a phrase selection from a user that corresponds to one of the context-specific phrases;

include the context-specific phrase corresponding to the phrase selection in a context-specific message; and send the context-specific message to a recipient over a computer network.

16. The information handling system of claim 15 wherein the message generation tool is further effective to:

display, on the video display device, the one or more context-specific phrases.

17. The information handling system of claim 15 wherein the message generation tool is further effective to:

include a page link in the context-specific message, the page link corresponding to the page of data.

18. The information handling system of claim 15 wherein the message generation tool is further effective to:

determine that the identified region is time sensitive;

retrieve a current time from a computer system clock; and select the one or more context-specific phrases based upon the retrieved current time.

19. The information handling system of claim 15 wherein the message generation tool is further effective to:

receive user text; and include the user text in the context-specific message session.

20. The information handling system of claim 15 wherein the identified region corresponds to one or more recipient identifiers, the message generation tool further effective to:

display, on the video display device, the one or more recipient identifiers; and wherein the phrase selection corresponds to one of the recipient identifiers.

21. A computer-implemented method comprising:

displaying, on a video display device, a page of data that includes a plurality of regions;

receiving a user action corresponding to the page of data;

identifying the region from the plurality of regions where the user action was performed;

retrieving, from computer readable storage, one or more context-specific phrases that correspond to the identified region;

displaying, on the video display device, the context-specific phrases;

receiving a phrase selection that corresponds to one of the context-specific phrases;

initiating a context-specific message session based upon the phrase selection;

including the context-specific phrase that corresponds to the phrase selection in a context-specific message; and sending the context-specific message to a recipient over a computer network.

* * * * *